Figure 1:
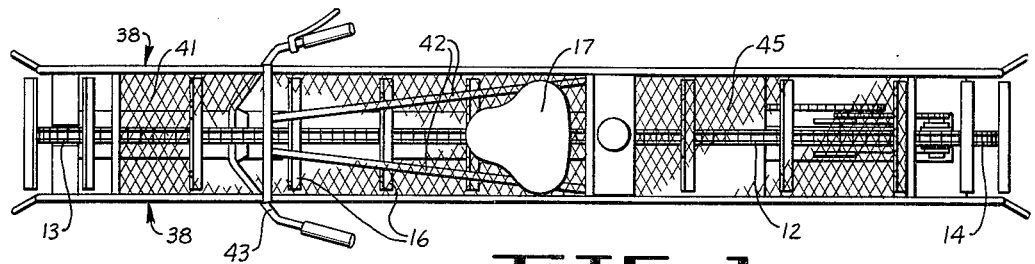

Dec. 7, 1965    J. WALSH    3,221,830

CROSS-COUNTRY SNOW VEHICLE

Filed Dec. 14, 1961    2 Sheets-Sheet 1

INVENTOR.
JACK WALSH
BY
Schapp & Hatch
ATTORNEYS

INVENTOR.
JACK WALSH
BY Schapp & Hatch
ATTORNEYS

United States Patent Office 3,221,830
Patented Dec. 7, 1965

3,221,830
CROSS-COUNTRY SNOW VEHICLE
Jack Walsh, 519 6th St., Eureka, Calif.
Filed Dec. 14, 1961, Ser. No. 159,294
4 Claims. (Cl. 180—5)

This invention relates to improvements in a cross-country snow vehicle and more particularly to a self-contained vehicle adapted to propel itself and an operator across snow-covered terrain. The present device is intended for use by skiers in traveling cross-country over both flat and hilly territory with the vehicle doing all of the hard work.

The vehicle is particularly suited for use by persons who have to traverse remote areas not served by roads and highways, such as timber cruisers, telephone and electrical linemen, trappers, snow cruisers and the like. For use in trackless and sometimes rugged country, it is essential that the vehicle be compact and maneuverable. It should be as narrow as possable in order to pass between close-set trees and rocks, and must be completely controllable in order to avoid uncontrolled skids and sliding.

Previous attempts to provide such a vehicle have proved unsatisfactory because of failure to meet one or more of the recited conditions. One serious defect has been in the means for steering the vehicle. Steering devices have commonly taken the form of an articulated runner, a rudder-like snow-engaging member or short ski-like outriggers. The first two devices do not steer well, and the outriggers extend too far to the sides and are extremely complicated and delicate in structure.

The powered sled of the present invention circumvents the steering problem by eliminating extraneous steering devices. The skier sits astride the machine and guides it by shifting his weight and by tipping and angling his skis in the manner commonly called "snow-plowing." Thus, no additional guide or steering means is needed, and, if a narrow passage is encountered, the rider can draw his skis close to the vehicle or even remove them.

For making sharp turns, the skier stands up on his skis and bodily lifts the forward end of the machine while still straddling same. He is then able to swing the vehicle around and avoid obstacles in a manner impossible with other methods of steering. In order to permit this lifting action the vehicle should be as light in weight and as compact as possible consonant with the requirement that it be effective in traversing all types of topography and under differing snow conditions.

Such a snow vehicle is disclosed in my co-pending application Serial No. 826,826, filed July 13, 1959, now Patent No. 3,146,840, and entitled "Powered Snow Sled," this application being a continuation in part of same and incorporating by reference pertinent subject matter disclosed therein.

The present invention contemplates a snow vehicle of the type described which is of light metal construction throughout so as to provide the desired light weight and compactness. Certain problems, such as wear and the tendency of snow and ice to freeze onto bare metal surfaces, are overcome through the provision of novel, self-lubricating and water-repellent means.

Although the drive chain of my previous sled is of a construction which is not particularly susceptible to freezing up during periods of disuse, there is a tendency for the cleats to freeze to the runner, particularly where they are both of metal. Hence in the provision of a light-weight sled, wherein the utilization of a light-weight metal such as aluminum is indicated in the construction of the runner and cleats, there is a severe tendency for them to freeze together after the sled stands out of doors for an idle period. Also, wear and friction between the metal cleats and runner are formidable problems encountered in the construction of a light-weight sled.

It is therefore an object of the present invention to provide a powered snow vehicle of light weight construction wherein the runner and cleats may be made of light-weight metal without detriment to the operation of the sled.

Another object of the invention is the provision of a powered snow sled of the class described wherein means is provided to repel snow and water from the surfaces of the cleats in sliding engagement with the bottom of the runner and thus minimize the possibility of their freezing together.

It is still another object of the invention to minimize friction and abrasion between the cleats and runner of a powered snow sled.

A further object of the invention is to provide low-friction bearing means, between the snow-engaging cleats and runner of a powered snow sled of the class described, which may be readily replaced at relatively low cost.

Another object of the invention is to provide a snow vehicle of the character described which is compactly proportioned and is light enough in weight to permit the skier to stand erect on his skis and lift the vehicle for effecting short radius turns.

Further objects and advantages of my invention will appear as the specification proceeds, and the new and useful features of my improved powered snow sled will be fully defined in the claims attached hereto.

Figure 2:
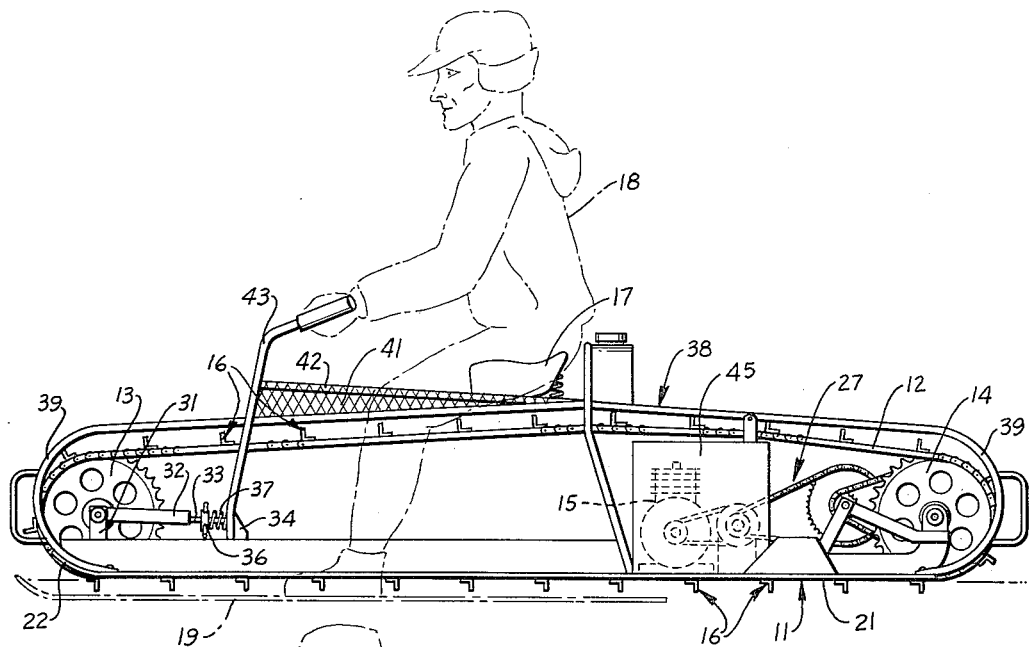
Figure 3:
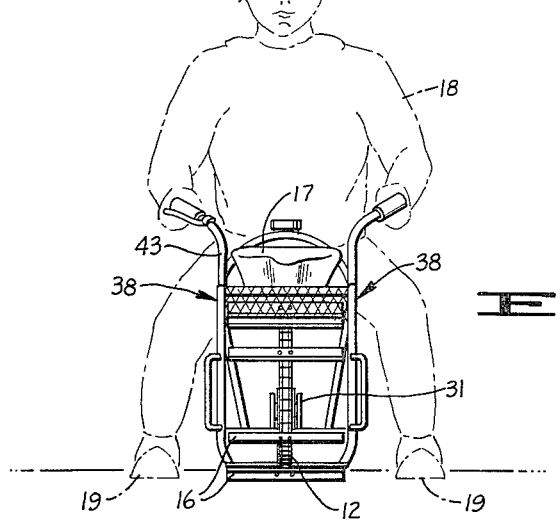
Figure 4:
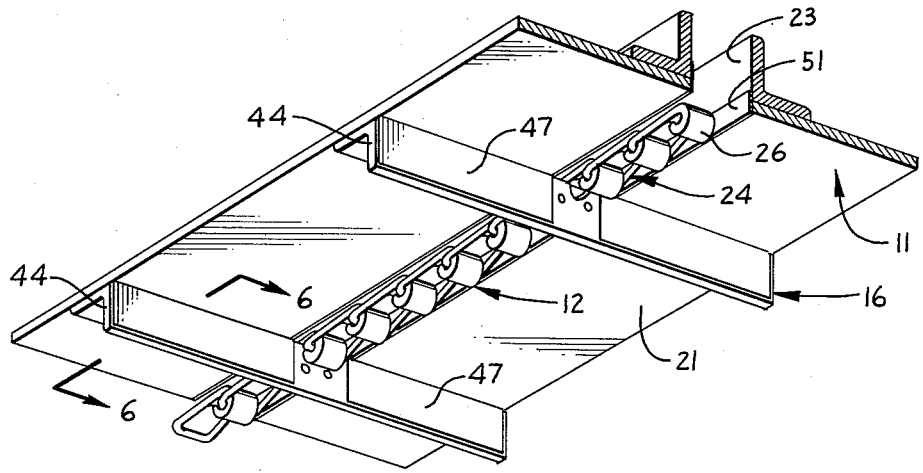
Figure 5:
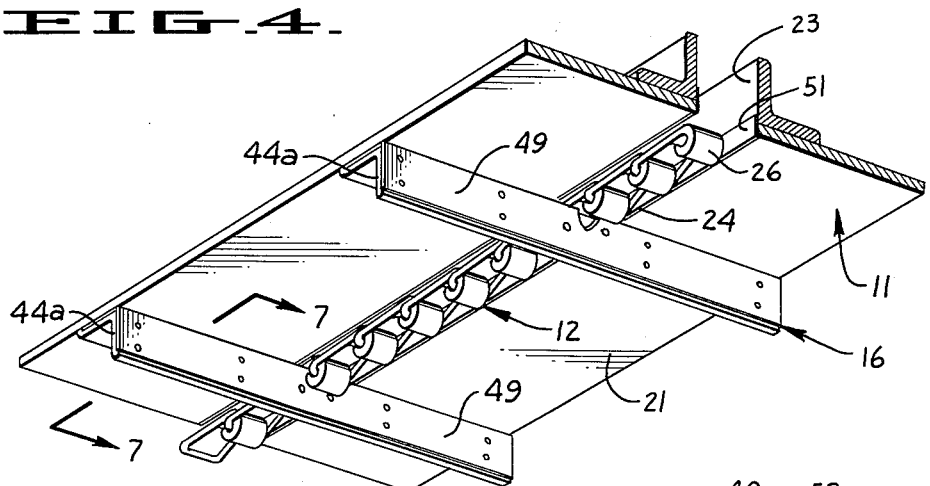
Figure 7:
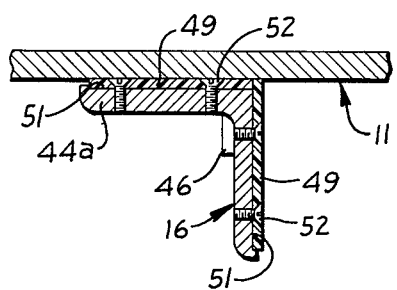
Figure 6:
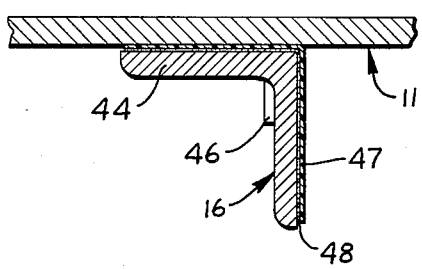

The preferred form of my invention is illustrated in the accompanying drawings, forming part of this application, in which:

FIGURE 1 is a top plan view of the improved light-weight snow vehicle of the present invention;

FIGURE 2, a side elevational view of the snow sled of FIGURE 1;

FIGURE 3, a front elevational view of the snow sled of FIGURE 1;

FIGURE 4, an enlarged fragmentary perspective view of a portion of the cleated drive chain and bottom of the runner, the view illustrating particularly the ice-repelling bearing means mounted therebetween;

FIGURE 5, a view taken similar to that of FIGURE 4 but illustrating a modified form of the bearing means;

FIGURE 6, an enlarged fragmentary cross sectional view taken substantially on the plane of line 6—6 of FIGURE 4; and FIGURE 7, an enlarged fragmentary cross sectional view taken substantially on the plane of line 7—7 of FIGURE 5.

While I have shown only the preferred form of my invention, it should be understood that various changes or modifications may be made within the scope of the claims hereto attached, without departing from the spirit of the invention.

Referring to the drawings in detail, it will be seen that a light-weight powered snow vehicle is provided that is generally in accordance with my hereinbefore referenced prior copending patent application but which incorporates structural features directed to maneuverability, resistance to wear, and freedom from freezing up. More specifically, the present vehicle consists basically of an elongated snow runner 11, a continuous chain 12 entrained on pulleys 13 and 14 journaled at the ends of the runner and coupled to a drive motor or engine 15 carried thereon, snow-engaging cleats 16 fastened to the chain, and a seat 17 mounted on the runner on which a ski-shod operator 18 sits and straddles the vehicle, with his skis 19 riding on the snow on opposite sides of the runner for controlling the direction of travel of the vehicle.

The runner 11 has a generally flat bottom 21 and an up-curved front end 22 with the length-to-width ratio of the runner being such as to provide a sufficient surface area to support the weight of the vehicle and rider in soft snow. In addition, the bottom surface of the runner is provided with a central longitudinally extending groove 23, as best shown in FIGURES 5 and 6.

The chain 12 passes around the pulleys 13 and 14, journaled at the opposite ends of the runner, and lies in a vertical plane which coincides with the longitudinal center line of the runner. The upper horizontal course of the chain thus passes in spaced relation above the runner and the lower horizontal course therof passes through the groove 23. The chain is best formed of a series of flat, square links 24, each of which has a hook portion 26 pivotally engaging the next link in such manner that it may be disconnected by flexing and sliding sideways. This variety of chain is less likely to freeze up than other types of chain.

The vehicle is particularly designed for permitting the skier to stand erect and lift the forward portion free of the snow. The skier can then swing the vehicle around the snow-contacting rear end and thus make extremely sharp turns. To accomplish this result, the forward portion of the vehicle is very light and this is partially accomplished by mounting the engine 15 on the runner 11 toward the rear thereof. It should be understood that the engine should also be as light in weight as possible, and accordingly I prefer to utilize an extremely light-weight gasoline fueled engine such as a 3½ H.P. 4-cycle aluminum block engine, manufactured by Briggs & Stratton Co. of Milwaukee, Wisconsin.

In order to provide adequate pulling power with the light-weight engine 15, I prefer to use a load reacting, variable speed drive means 27 to transmit power from the engine to chain 12. A suitable drive means 27 may be had by driving sprocket 14 through a variable-speed clutch such as the unit commercially available from the Salisbury Co. of Los Angeles, California.

These units vary the pitch ratio between a drive pulley and a driven pulley in accordance with the speed of rotation of the drive pulley. Thus, as greater load is imposed, the engine will slow down and this slowing will increase the drive ratio to provide increased pulling power at the expense of speed.

The front drive pulley 13 is journalled between brackets 31 which are mounted for translation longitudinally of the runner 11. A bifurcated link arm 32 extends rearwardly from the brackets and has a threaded rod 33 which passes loosely through a bore formed in a boss 34 projecting upwardly from the runner. A nut 36 is threaded on the rod 33 and a coil spring 37 is compressed between the nut and boss. The foregoing assembly thus functions as a take-up means for adjusting tension on the drive chain 12 and for taking up shock applied to the front pulley. The compression on the spring, as determined by a rotating nut 36, determines the tension on the drive chain and the spring will yield to absorb the shock if the pulley 13 strikes an obstruction.

It will be appreciated that the powered sled described above is in basic respects similar to that disclosed in my previously referenced copending application. However, in accordance with the present invention and in keeping with a light-weight construction of the sled, the runner 11 is fabricated from a light-weight metal, preferably aluminum. Side structure for the light-weight sled comprises parallel spaced, generally longitudinal frame members 38 having downwardly turned semicircular end portions 39 secured at their lower ends to the runner in generally circumscribing relation to the pulleys 13, 14. The frame members are preferably tubular and fabricated from aluminum or equivalent light-weight metal in the interest of weight reduction.

The side frames 38 serve to support a mesh cowling 41, of aluminum or the like, secured transversely therebetween so as to enclose the upper reach of the drive chain and prevent snow from being thrown from the chain upon the operator. Snow will not pack on the top of the cowling and become heavy by virtue of the mesh construction thereof. The motor 15 is likewise protected from picked-up snow by an imperforate hood 45 which is mounted on the runner in encompassing relation to the motor.

Also in the interests of light weight and freedom of movement of the legs of the skier, the seat 17 is in the form of a saddle supported between longitudinals 42. The longitudinals are preferably of aluminum tubing and are secured between the side frame members 38 and forwardly disposed handle bars 43 which extend vertically upwardly from runner 11 adjacent the opposite sides thereof.

Finally, it is particularly important to note that in the light-weight sled construction of the present invention, the cleats 16 are as light as possible and are formed as angle members 44 of thin-gauge steel alloy or of a light-weight metal such as aluminum. The angles are transversely secured at spaced intervals along the chain 12, one leg of the angle being attached to ears 46 formed on special ones of the links and the other leg of the angle projecting upwardly from the first leg at its forward end relative to the direction of chain traverse. The angles are of the same width as the runner in order to facilitate efficient traction with the snow passing under the runner. The angles are in sliding contact with the bottom surface of the runner while the chain is recessed within groove 23. Substantial abrasion and wear would normally occur between the metal runner and metal angle member cleats and there would normally be a severe tendency for these metal parts to freeze together.

As a particularly salient aspect of the persent invention the tendencies toward wear and freezing are prevented, or at least minimized, by bearing strips 47 of durable snow-repellent slippery plastic material secured to the surface of the cleat angle members 44 adjacent the bottom surface of the runner. More explicitly the strips 47 are attached to the under surface of the horizontal leg of each angle member on opposite sides of the chain. The strips are upwardly turned and secured to the leading surface of the vertical leg of each angle member. Hence the strips 47 slidingly contact the runner to thus provide snow-repellent, low-friction bearing surfaces therebetween.

As indicated previously, the strips 47 serve two purposes. Firstly, they reduce the wear between the cleats and the runner, and secondly they prevent freezing of the cleats to the runner when the machine is at rest. Reduction of wear is accomplished by utilizing a material having a low coefficient of friction with the aluminum or other light metal from which the runner is formed.

In the present environment, that is, where a cleat is rubbing along the length of a runner supported on snow, the required low coefficient of friction is achieved by forming the strips 47 of a plastic material which is inherently slippery or which will become slippery when covered with a thin film of water formed from the snow by heat of friction.

In the form of the invention illustrated in FIGURES 4 and 6, the strips 47 are applied in sheet form and are adhered to the cleats by a suitable bonding agent 48. A preferred material is polytetrafluoroethylene, commonly known as Teflon, this material being very slippery, dry or wet, and at the same time being repellent to water in such manner as to prevent ice from adhearing thereto. Other plastic materials possessing the described characteristics may also be employed.

A number of adhesives effective for bonding the Teflon strips 47 to the metal cleats 44 are commonly available, one of such adhesives being widely known under the trademark "Grip" and is made by Royal Sales & Mfg. Co. of Los Angeles, California. Alternatively it is contemplated that the Teflon may be applied to the metal in liquid form and processed to provide a solid coating thereon.

Where plastics other than Teflon are used, a wide variety of suitable adhesives are available. In fact, a commercially available product suitable for present purposes is a plastic-faced tape intended for application to the bottoms of skis to obviate waxing thereof, this tape being known commercially as "Tey Tape" and manufactured by Johnny Seesaw's, Peru, Vermont. Another suitable commercially available material is known as "Go" and is marketed by Go U.S.A., Inc., Box 202, Pearl River, New York.

In the form of the invention illustrated in FIGURES 5 and 7 of the drawings, the anti-friction, water-repellent material consists of Teflon blocks 49 mounted in shallow recesses 51 formed in the upper and forward faces of the cleat 44a. The blocks 49 may be secured in place by an adhesive similar to that described in connection with FIGURES 4 and 5 or, preferably, are secured in the recesses by means of screws 52 threadably engaged with the cleat.

Side thrust on the vehicle will tend to force the chain against the sides of the groove 23 and cause wear and icing problems. Any of the anti-friction and anti-icing means discussed in connection with strips 47 and blocks 49 may be used along the sides of the groove as at 51 to eliminate such problems.

From the foregoing it will be seen that I have provided a powered snow sled vehicle of unique light-weight construction, incorporating anti-wear and anti-icing means into the construction of the supporting runner and snow-engaging cleats.

I claim:

1. A light-weight snow vehicle comprising an elongated runner of light-weight metal having a flat bottom formed with a downwardly facing groove along its longitudinal centerline, power means on said runner adapted to engage and thrust against the snow for moving the runner thereover, said power means including a continuous chain entrained around pulleys at opposite ends of said runner and with the lower reach of the chain supported for longitudinal movement through said groove, a plurality of angle member cross cleats of light-weight metal having one of their legs secured to said chain in position to sweep across the bottom surface of said runner and the other of their legs projecting from the leading end of the first leg relative to the direction of chain traverse, strips of moisture-repellent low-friction plastic secured to each cleat on opposite sides of said chain with the strips extending along substantially the entire bearing and leading end surfaces of the cleats, and a seat on said runner, said seat being formed to support a ski-shod operator astride the seat and with his skis riding on the snow on opposite sides of the runner for controlling the direction of travel of the vehicle.

2. A powered snow sled of light weight construction comprising an elongated runner of light-weight metal having a flat bottom formed with a downwardly facing groove along its longitudinal centerline, a pair of pulleys mounted for rotation in a vertical plane lying on the longitudinal centerline of the runner, a continuous chain entrained around said pulleys to provide an upper horizontal reach passing in spaced relation above said runner and a lower horizontal reach passing through said groove, a plurality of angle member cleats of light-weight metal, said cleats having one leg secured transversely to said chain in position to sweep across the bottom surface of the runner upon movement of said chain around said pulleys and the other leg projecting from the leading end of the first leg relative to chain movement, strips of moisture-repellent low-friction plastic secured on opposite sides of said chain to the surface of each cleat that passes adjacent the bottom of said runner and extending over a portion of the leading surface of the cleat, motive means carried by said runner and connected to one of said pulleys for rotating the latter so as to drive the chain, a pair of parallel tubular side frame members of light-weight metal secured adjacent the sides of said runner, said side frame members surmounting the path in a vertical plane traversed by said chain, a mesh cowl of light-weight metal secured transversely between said side frame members, a hood of light-weight metal enclosing said motive means, a seat mounted above said cowl, said seat being formed to support a ski-shod operator astride the seat with his skis riding on the snow on opposite sides of the runner for controlling the direction of travel thereof, and handle bars secured to said runner forwardly of said seat.

3. A light-weight snow vehicle as defined in claim 1 and wherein said strips of moisture-repellent low-friction plastic comprise strips of polytetraflouroethylene.

4. A light-weight snow vehicle as defined in claim 3 and wherein said strips consist of blocks of said plastic mounted in shallow recesses and removably secured therein by a plurality of screws threadably engaged with said cleats.

References Cited by the Examiner

UNITED STATES PATENTS

| 122,850 | 1/1872 | Parvin | 305—18 |
|---------|--------|--------|--------|
| 2,061,290 | 11/1936 | Riemerschmid | 180—9.24 |
| 2,183,976 | 12/1939 | Smith | 87—44 X |
| 2,312,071 | 2/1943 | Broadwater | 180—5 |
| 2,323,526 | 7/1943 | Eliason | 180—5 X |
| 2,702,088 | 2/1955 | Klimek | 180—5 |
| 2,892,657 | 6/1959 | Brand et al. | 296—44.5 |
| 2,908,506 | 10/1959 | Runton | 280—11.13 |
| 2,984,963 | 5/1961 | Reuter. | |
| 3,146,840 | 9/1964 | Walsh | 305—18 X |

FOREIGN PATENTS

| 479,495 | 3/1953 | Italy. |
| 121,664 | 5/1948 | Sweden. |

ARTHUR L. LA POINT, *Primary Examiner.*

LEO FRIAGLIA, A. HARRY LEVY, *Examiners.*